United States Patent [19]
Sears

[11] Patent Number: 5,597,453
[45] Date of Patent: Jan. 28, 1997

[54] APPARATUS AND METHOD FOR VAPOR COMPRESSION DISTILLATION DEVICE

[75] Inventor: Stephan B. Sears, Menlo Park, Calif.

[73] Assignee: Superstill Technology, Inc., Redwood City, Calif.

[21] Appl. No.: 962,256

[22] Filed: Oct. 16, 1992

[51] Int. Cl.$^6$ .................. B01D 1/28; B01D 3/00
[52] U.S. Cl. .......... 203/24; 159/24.1; 159/28.6; 159/47.1; 159/DIG. 42; 202/172; 202/176; 202/182; 202/235; 203/26; 203/71; 203/100; 203/DIG. 8; 165/166; 165/167
[58] Field of Search .................. 159/28.6, 24.1, 159/47.1, DIG. 42; 203/26, 24, 71, 100, DIG. 8, 27; 202/235, 172, 176, 182, 269; 165/166, 167, 164–165

[56] References Cited

U.S. PATENT DOCUMENTS

| | | |
|---|---|---|
| 838,195 | 12/1906 | LeSueur . |
| 2,185,595 | 1/1940 | Kleinschmidt . |
| 2,379,519 | 7/1945 | Hall . |
| 2,389,789 | 11/1945 | Latham, Jr. . |
| 2,487,884 | 11/1949 | Lunt . |
| 2,589,406 | 3/1952 | Latham, Jr. . |
| 2,793,988 | 5/1957 | Latham, Jr. et al. . |
| 2,806,676 | 9/1957 | Frankel .................. 165/166 |
| 2,960,160 | 11/1960 | Goodman . |
| 3,155,565 | 11/1964 | Goodman . |
| 3,256,704 | 6/1966 | Becker .................. 165/166 |
| 3,288,685 | 11/1966 | Kemper et al. . |
| 3,310,105 | 3/1967 | Butt .................. 109/28.6 |
| 3,404,733 | 10/1968 | Pottharst, Jr. .................. 165/166 |
| 3,469,615 | 9/1969 | Usher . |
| 3,489,651 | 1/1970 | DePas . |
| 3,494,835 | 2/1970 | Mahistre . |
| 3,537,513 | 11/1970 | Austin et al. .................. 165/166 |
| 3,586,090 | 6/1971 | Henderson .................. 159/13.3 |
| 3,610,330 | 10/1971 | Nasser .................. 165/166 |
| 3,759,308 | 9/1973 | Gebauer .................. 159/28.6 |
| 3,829,945 | 8/1974 | Kanzler et al. .................. 165/166 |
| 3,840,070 | 10/1974 | Becker et al. .................. 159/28.6 |
| 3,847,211 | 11/1974 | Fischel et al. .................. 165/166 |
| 3,984,281 | 10/1976 | Buchwald .................. 159/28.6 |
| 4,156,459 | 5/1979 | Kusuda et al. .................. 159/13.3 |
| 4,341,601 | 7/1982 | Hartig . |
| 4,347,896 | 9/1982 | Rosman et al. .................. 165/166 |
| 4,572,766 | 2/1986 | Dimitriou .................. 159/28.6 |
| 4,640,740 | 2/1987 | Moore et al. .................. 159/28.6 |
| 4,671,856 | 6/1987 | Sears .................. 203/26 |
| 4,699,209 | 10/1987 | Thorogood .................. 165/166 |
| 4,715,433 | 12/1987 | Schwarz et al. .................. 165/166 |
| 4,823,867 | 4/1989 | Pollard et al. .................. 165/166 |
| 4,844,151 | 7/1989 | Cohen .................. 165/166 |
| 4,936,954 | 6/1990 | Sander .................. 159/28.6 |
| 4,978,429 | 12/1990 | Sears .................. 203/26 |
| 5,098,518 | 3/1992 | Sakai et al. .................. 159/28.6 |
| 5,193,611 | 3/1993 | Hesselgreaves .................. 165/166 |
| 5,232,557 | 8/1993 | Kontu et al. .................. 202/182 |

*Primary Examiner*—Virginia Manoharan
*Attorney, Agent, or Firm*—Howell & Haferkamp, L.C.

[57] ABSTRACT

A vapor compression distillation/product concentration device includes an evaporator/condenser core, with alternating boiling and condensing chambers with edge manifolds such that substantially the entirety of each plate surface is used as a heat transfer surface. Seals are conveniently formed between adjacent plates by laying a bead of liquid gasketing material such that as the plates are laid atop each other and cured, a waffle-like seal is formed surrounding the contact points between adjacent plates which interlocks the seal with the plates. A truly perpendicular fluid flow is achieved between the alternating boiling chambers and condensing chambers as each fluid traverses the entirety of each chamber in a unidirectional flow as it passes through the evaporator/condenser core.

21 Claims, 15 Drawing Sheets

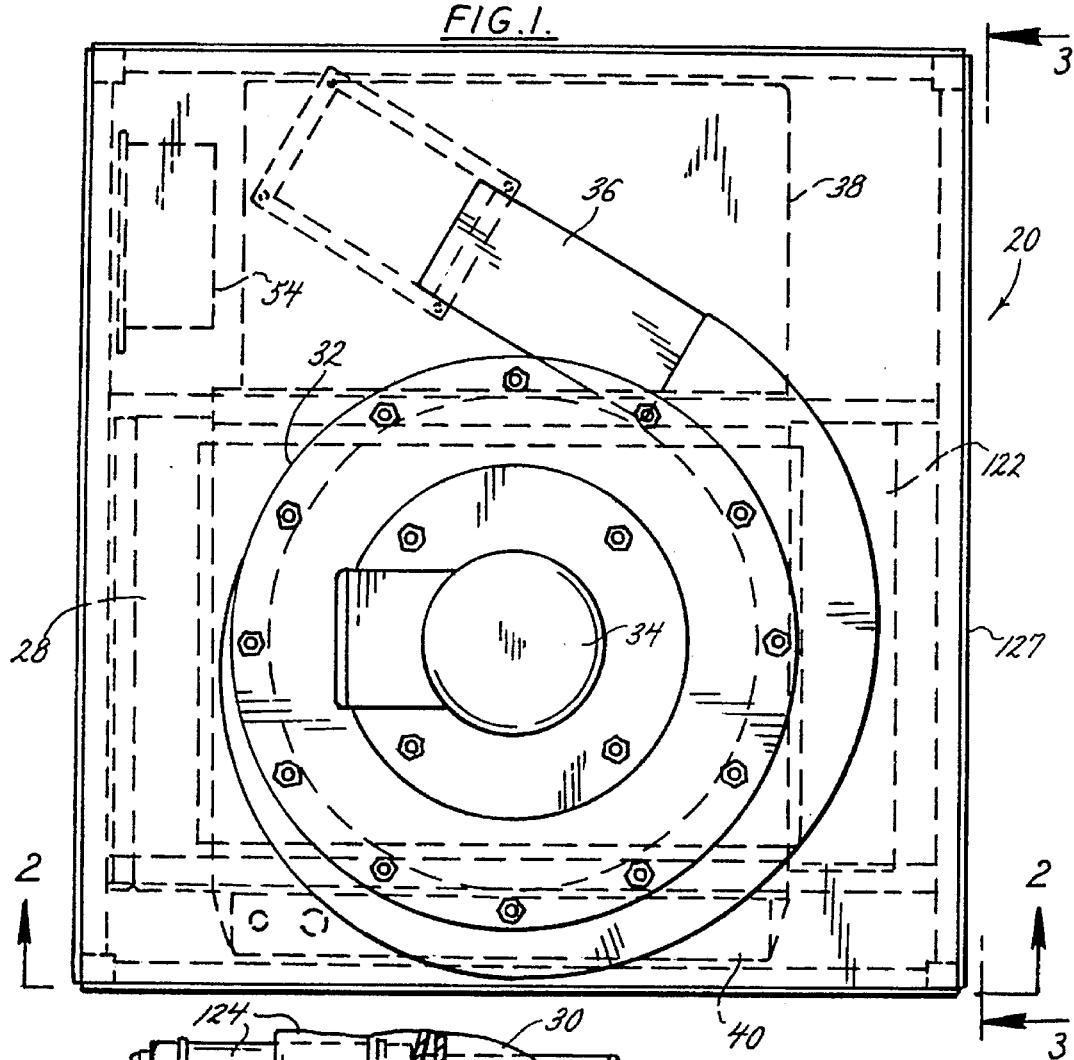
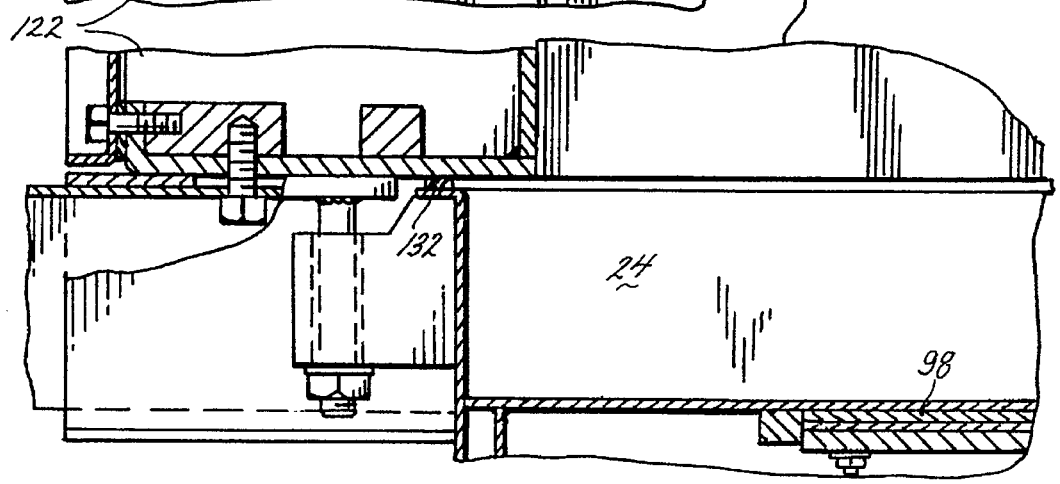

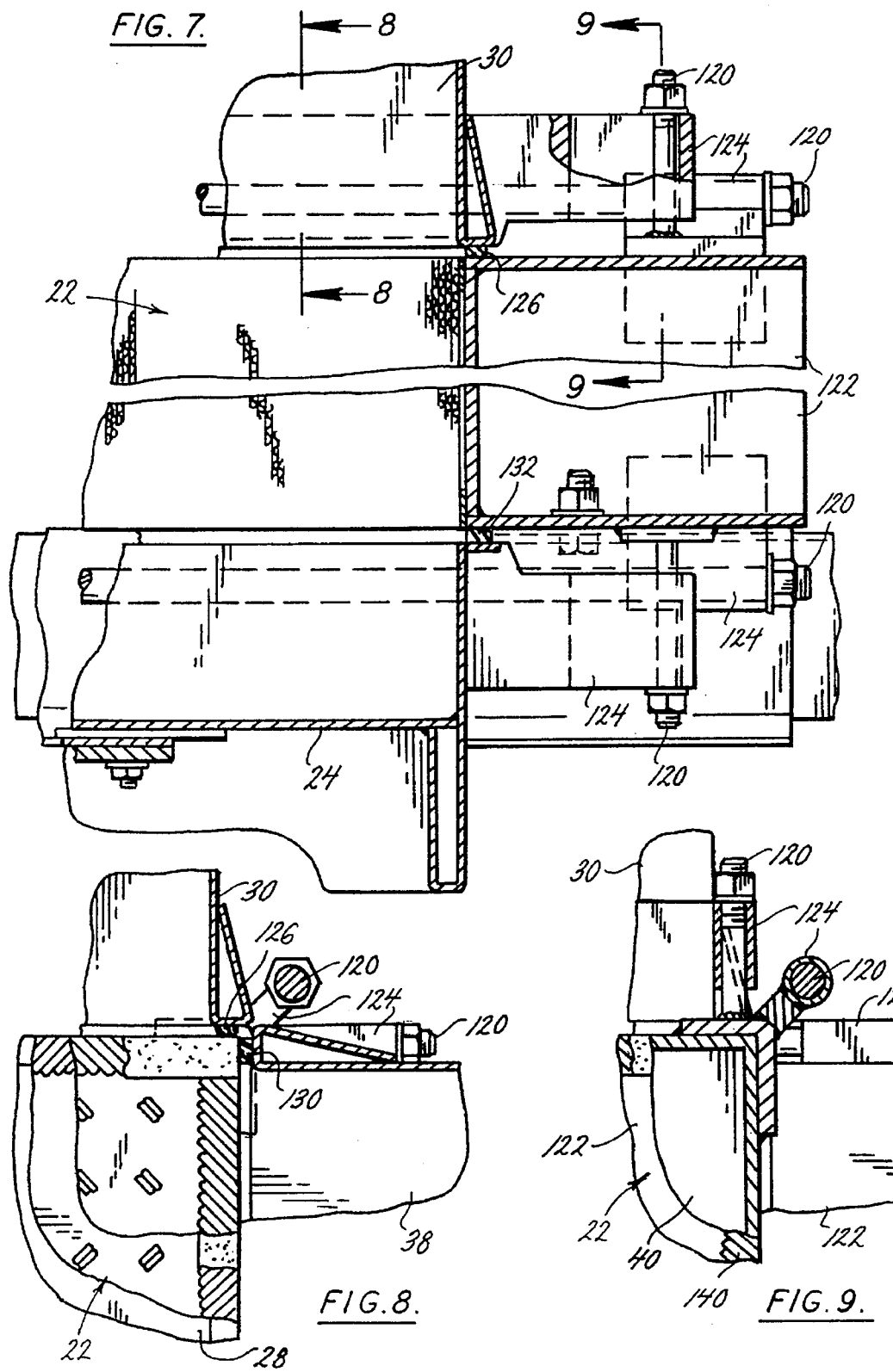

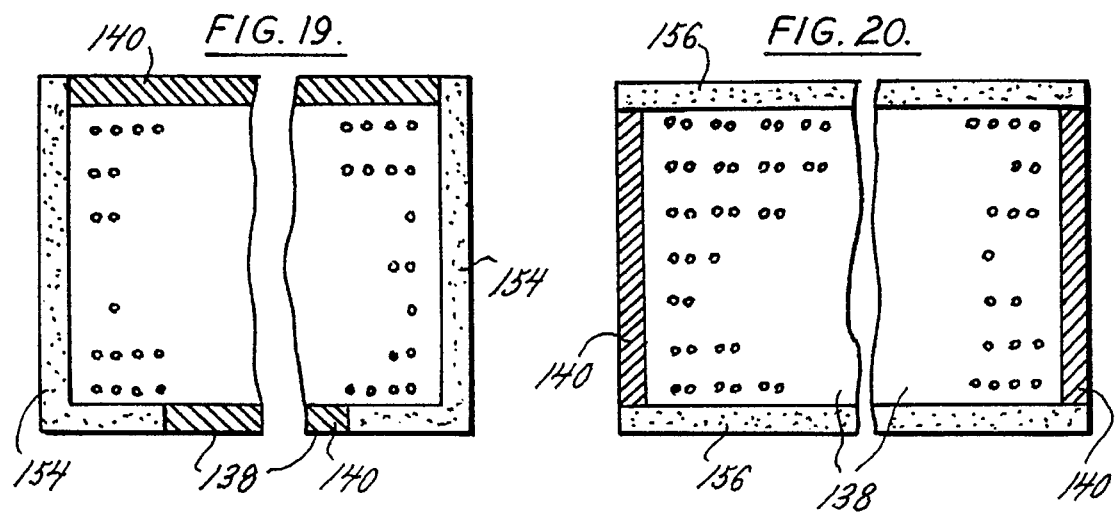
FIG. 19.
FIG. 20.
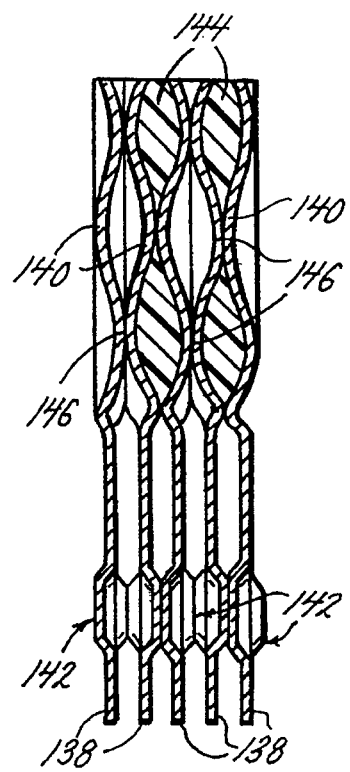
FIG. 21.
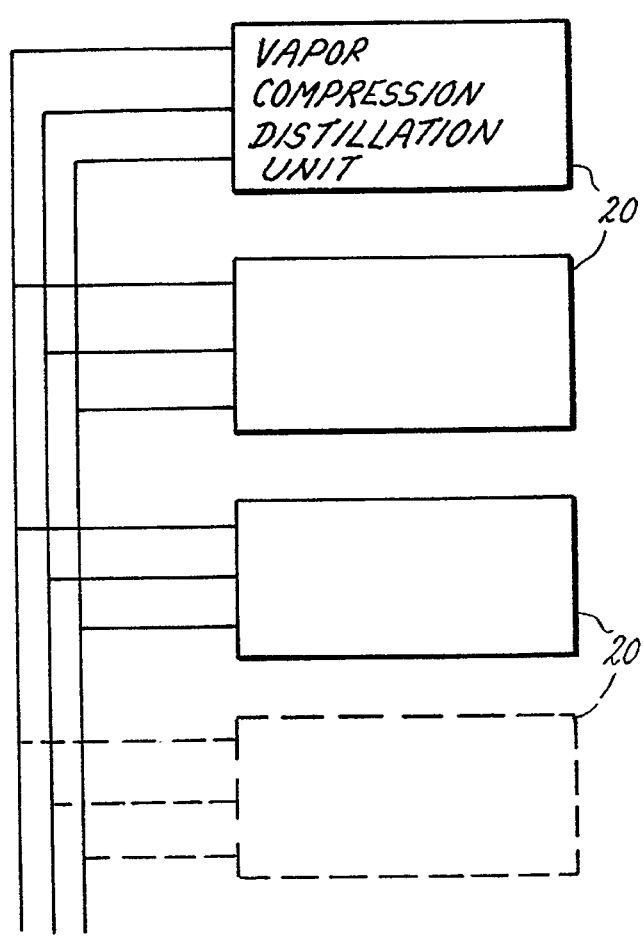
FIG. 22.

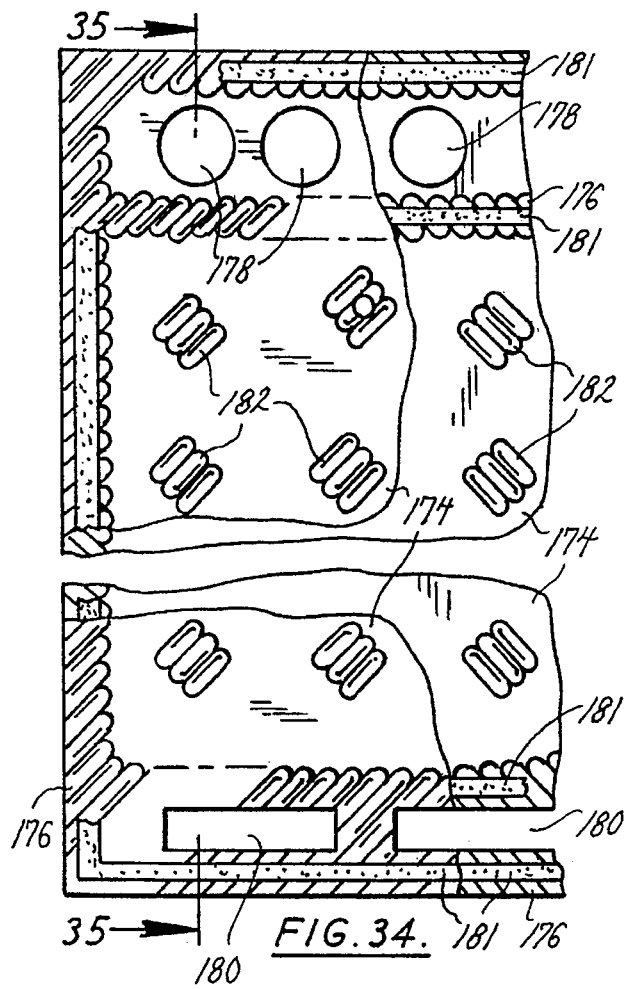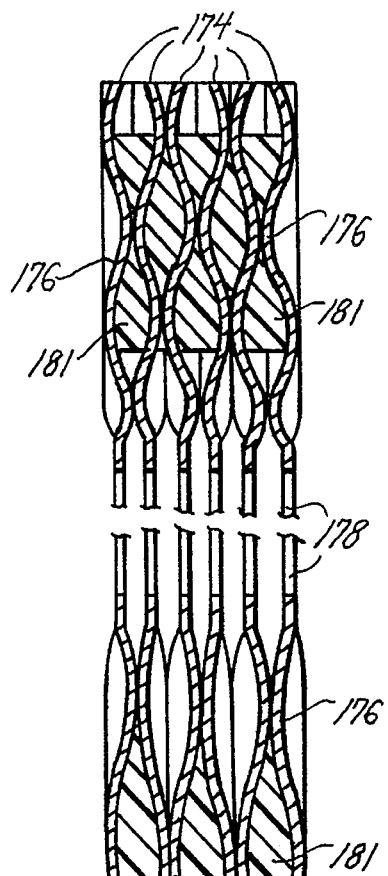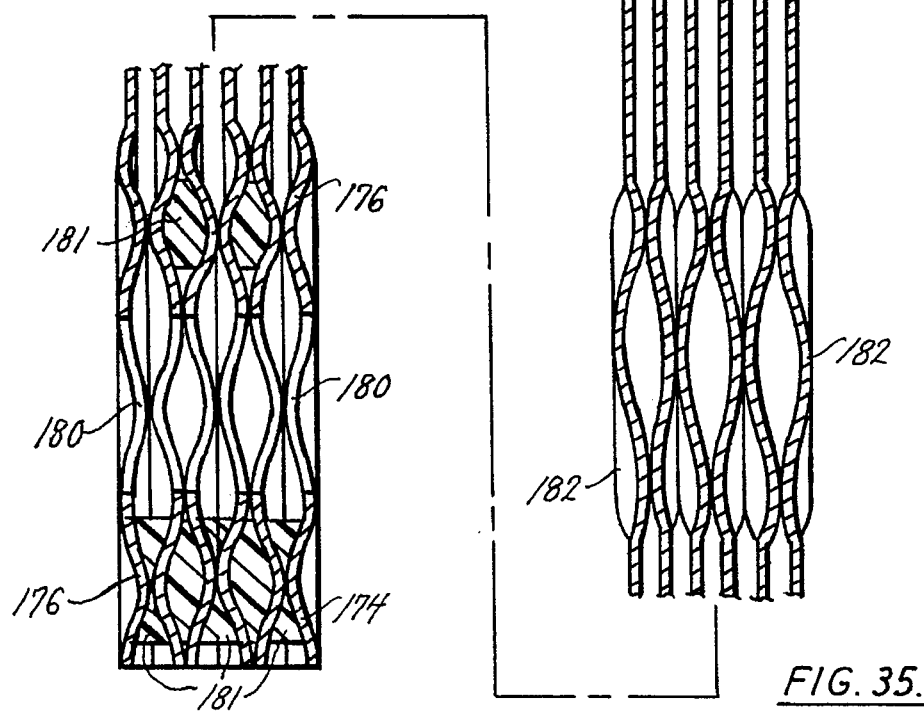
FIG. 34.
FIG. 35.

1

APPARATUS AND METHOD FOR VAPOR COMPRESSION DISTILLATION DEVICE

BACKGROUND AND SUMMARY OF THE INVENTION

Low pressure, high efficiency vapor compression distillation and product concentration devices are known in the art, principally through the prior work of the inventor herein both in his commercialization of these devices as well as his prior patents including U.S. Pat. Nos. 4,671,856; 4,769,113; 4,869,067; 4,902,197; 4,919,592; and 4,978,429, the disclosures of which are incorporated herein by reference. As shown in the inventor's '856 patent, a vapor compression distillation device is generally comprised of a first plate-type heat exchanger which preheats the feed liquid by transferring the heat from the distilled product and waste in a three fluid, fluid-to-fluid heat transfer process. A second plate-type evaporator/condenser heat exchanger has a plurality of plates defining a plurality of alternating boiling and condensing chambers having generally counter-cyclical flow, with a low pressure compressor for pressurizing the heated steam after it exits the boiling chambers and before it enters the condensing chambers. As explained and disclosed in the patent, the alternating boiling and condensing chambers are separated by plates which are desirably very thin to facilitate the transfer of heat therethrough. The plate pack construction includes precut neoprene or silicone gaskets which define the chambers and allow for internal manifolding which extends generally perpendicularly through the plates. Generally, fluid flow through the condensing chambers is in a vertically downward direction while in the boiling chambers, the feed liquid is maintained at a height to substantially cover the boiling surfaces such that steam created thereby generally flows outwardly towards the peripheral edges of the boiling chambers, and between pluralities of gasket members, to enter the steam manifolds. Thus, there is no strictly defined, unidirectional flow of steam from within the boiling chambers to the steam manifolds.

The device disclosed and claimed in the inventor's '856 patent is a good and valuable invention which has met with great commercial success. However, the inventor has continued his efforts to improve upon the breakthrough invention to render the process even more energy efficient and, hence, economical to operate.

Accordingly, there is disclosed and claimed herein, a new design for a vapor compression distillation device which provides significant advantages even over that provided by the inventor's prior invention as disclosed and claimed in the '856 patent. In his work, the inventor has determined that a truly perpendicular flow of fluid between the alternating condensing and boiling chambers provides tremendous advantages, especially when coupled with a uniform vertically upward flow of steam through the boiling chambers. A uniform, defined flow of fluid through each of the chambers provides dramatically improved performance as it eliminates the tendency, in a low pressure system, for pockets of vapor to form and inhibit full utilization of the plate surfaces for heat transfer. This phenomenon is akin to "vapor lock" which can lock up one or more chambers, or portions thereof, and prevent their operating as desired. With a strictly defined, uniform flow through each of the chambers, the entire plate surfaces separating the chambers is effectively swept to eliminate air pockets, vapor lock, or other inefficiencies from developing in the chambers.

Still another area of improvement in the design disclosed and claimed herein is achieved through the use of edge manifolds which directly feed each of the boiling and condensing chambers from between the outer edges or sides of the plates themselves. This construction completely eliminates the portal type or through manifolding found, for example, in the inventor's prior design. This construction eliminates right angle fluid turns in both the boiling and condensing chambers to thereby greatly reduce the amount of pressure required to force the fluid through the chambers. This provides a significant energy savings and eliminates points of pressure drop which impede operation of the system. Also, this direct manifolding eliminates the circuitous path which the vapor has to travel as it exits the boiling chambers, is compressed, and is returned to the condensing chambers. An example of a well designed and minimally disruptive path is found in the inventor's prior '856 patent. However, even with the inventor's prior design, evaporating vapor from one end of the plate pack was forced to make a right angle turn and traverse the entire length of the plate pack to reach the compressor and then nearly duplicate the same path to re-enter the condensing chambers. As will be appreciated upon reviewing the drawings and description contained herein, this path is greatly shortened and straightened in the inventor's latest design. Again, this feature provides increased efficiencies and reduces energy loss.

Still another aspect of the inventor's prior design which has been improved on is the plate design and the gasketing used to join the plates together and to the edge manifolds. For efficient plate heat exchanger operation, the individual plates are ideally as thin as possible in order to promote efficient heat transfer between adjacent chambers, are accurately spaced uniformly across the entire plate surface in order to promote uniform fluid flow through adjacent chambers, and are gasketed to correctly isolate and also communicate between chambers in a reliable manner. The inventor's prior design shown in the '856 patent includes plates which are separated by edge gaskets along with internal gasketing to define the chambers and also diffuse the flow of fluid between chambers and manifolds. While this gasketing arrangement worked quite well in the inventor's prior design, several areas of improvement have been focused on in achieving the design of the present invention. For example, the edge gaskets are typically glued and clamped in order to hold them in position between adjacent plates and seal the chambers contained therebetween. As such, pressure inside the plate pack is exerted in a direction perpendicular to the sealing forces provided by the glue and the clamping. This arrangement is not ideally suited to resisting the internal forces between the plates. Still another feature of the inventor's prior design, and other prior art designs, includes expanses of adjacent plates which are not supported. In order to preserve the structural integrity, and achieve somewhat reliable uniform spacing, the thickness of the plate must be sized to span these distances. Of course, increasing the thickness of the plate is also undesirable in that it reduces the heat transfer between adjacent chambers.

In addressing these inherent limitations in prior art designs, the inventor herein has succeeded in designing and developing a new plate design and gasketing arrangement which provides a dramatic improvement in all of the aforementioned areas. In the inventor's new design, the periphery of each plate is corrugated, and a cross-hatched pattern of interrupted corrugations is formed across the surface of the plate. In assembling a plate pack, only one design need be used as the same plate is alternately reversed and the plates joined and held under pressure. With this construction and assembly, the cross-hatch pattern of interrupted corrugations provides contact points between each adjacent plates throughout the interior chambers of the plates to thereby accurately locate the sidewalls of each chamber and also structurally support them at a reliable, uniform distance throughout the heat exchanger plate pack. As the plates are alternately reversed, the interrupted corrugations (which may be one of many designs) touch each other at a minimal point, ideally an infinitesimally small point, and there is virtually no interruption in fluid flow as the fluids traverse the various chambers in the plate pack. Also, as there is a definable area occupied by each interrupted corrugation, manufacturing tolerances are not critical to be maintained in order that the plates will still align as they are assembled in alternating fashion.

The continuous corrugations surrounding the periphery of each plate also serve to provide a plurality of contact points between adjacent plates for structural support and integrity of the plate pack. However, the inventor has succeeded in incorporating these corrugations into an edge sealing process which is uniquely distinct and provides many advantages over prior art edge gasket arrangements. As the plates are assembled into a plate pack by alternately placing one plate atop the other, a bead of liquid gasketing material, such as silicone, etc. as is known in the art, is applied along those edges of the plate where gasketing is desired. Then, as the next plate is laid atop the previous plate with this bead of gasketing material, the gasketing material is forced into a waffle-like pattern surrounding the various contact points previously mentioned, and thereby adhere to each of the adjacent plates. As can be appreciated, after the gasketing material has been cured it interlocks with these contact points to provide a seal which is held in place by the plates themselves and is mechanically reinforced in a direction directly opposite from those forces tending to push the gaskets out from between the plates. As might be expected, this waffle-like gasketing arrangement provides significantly improved resistance to gasket "blow-out". Indeed, the inventor anticipates that for some applications, the bonding forces provided by the gasketing material itself may be sufficient to hold this waffle-like gasketing in place. Nevertheless, the plate pack may also be conveniently bolted and pressurized to further secure this waffle gasketing. Not only does the inventor's waffle gasketing provide greater sealing capabilities, it significantly reduces the amount of waste previously created in making the peripheral gasketing utilized in his prior design. As can be appreciated, a peripheral gasket, when cut from a sheet of gasketing material, creates a center waste portion which can exceed the actual amount of gasketing which is utilized in the peripheral gasket itself. By forming and curing the gasket in place, virtually all waste is eliminated which dramatically reduces the cost for gasketing material for a plate-type heat exchanger.

While the principal advantages and features of the invention have been explained above, a more thorough understanding may be attained by referring to the drawings and description of the preferred embodiment which follow.

BRIEF DESCRIPTION OF THE DRAWINGS

FIG. 1 is a top plan view of a vapor compression distillation device of the present invention;

FIG. 7 is a cross-sectional view taken along the plane of line 7—7 in FIG. 3 and detailing the clamping and sealing of the evaporator/condenser core and manifold;

FIG. 8 is a cross-sectional view taken along the plane of line 8—8 in FIG. 7 further detailing the sealing and clamping of the evaporator/condenser core;

FIG. 9 is a cross-sectional view taken along the plane of line 9—9 in FIG. 7 further detailing the sealing and clamping of the evaporator/condenser core and manifolds;

FIG. 12 is a cross-sectional view taken along the plane of line 12—12 in FIG. 11 and detailing the sealing arrangement for the level control and feed manifolds to the evaporator/condenser core;

FIG. 19 is an elevational view of the evaporator/condenser core detailing the seal pattern between adjacent plates for the boiling chambers;

FIG. 20 is an elevational view of the evaporator/condenser core detailing the seal pattern for the condensing chambers;

FIG. 21 is a partial cross-sectional view taken along the plane of line 21—21 in FIG. 13 and detailing the construction of the evaporator/condenser core;

FIG. 22 is a schematic view of the parallel connection of a multiple number of vapor compression distillation devices;

FIG. 29 is a cross-sectional view of the fixture used to assemble a heat exchanger plate pack with a heat exchanger assembly contained therein;

FIG. 30 is an exploded perspective view of the fixture used to assemble a heat exchanger plate pack;

FIG. 34 is a fragmentary elevational view of a plate assembly detailing the alternating pattern and support points between adjacent plates; and FIG. 35 is a cross-sectional view taken along the plane of line 35—35 in FIG. 34 and detailing the assembly of the evaporator/condenser core for retrofit.

Detailed Description of the Preferred Embodiment

Figure 6:
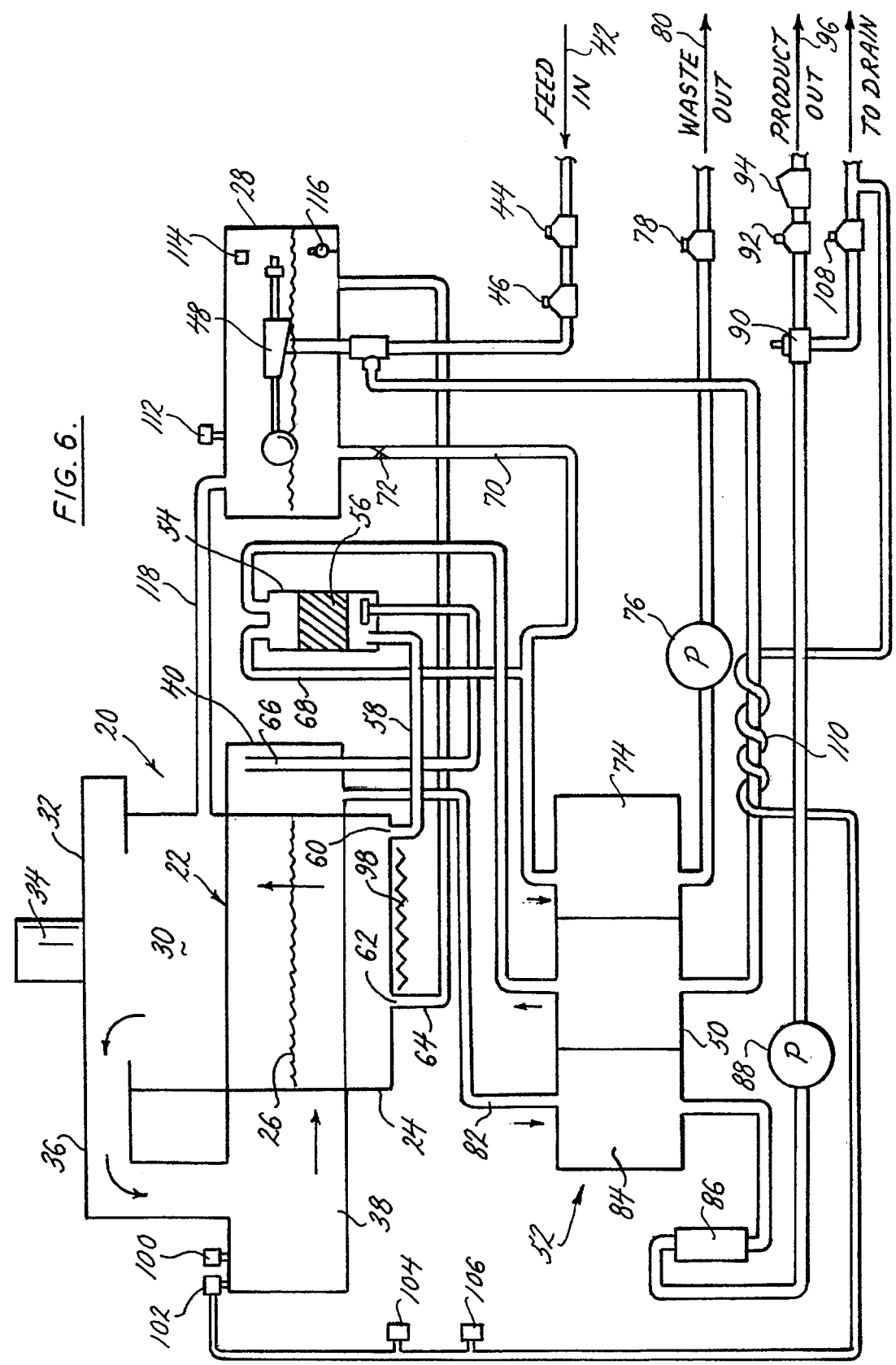
FIG. 6 is a schematic diagram of the invention in diagrammatic form detailing its principal components.

The inventor's vapor compression distillation invention will perhaps be best understood by first giving an overview of the major components and functional operation thereof. The functional schematic of FIG. 6 provides a convenient reference for this explanation. With reference to FIG. 6, there is shown the main vapor compression distillation device 20 which includes at its heart an assembled plate pack or evaporator/condenser core 22 which is comprised of a plurality of evaporator/condenser plates. A feed manifold 24 is sealed to the bottom of the evaporator/condenser core 22 and a level of feed fluid 26 is maintained in the boiling chambers by a level control manifold 28. As the feed fluid is evaporated, steam rises into the evaporator manifold 30 and then into the compressor 32 driven by compressor motor 34 which pressurizes the steam into a steam duct 36 which feeds the condenser manifold 38. The condenser manifold 38 is sealed to the side of the evaporator/condenser core so that the steam feeds into the alternating condensing chambers contained therein. As the steam flows through the evaporator/condenser core, and the condensing chambers contained therein, the steam condenses and flows into the product manifold 40 which is sealed to the opposite side of the evaporator/condenser core.

The feed liquid flows through an inlet 42 where it passes through a solenoid valve 44 and pressure regulator 46 into a float control valve 48 mounted within the level control manifold 28. As the level of feed therein (and correspondingly in the boiling chambers of the evaporator/condenser core 22) falls below a predetermined level, feed is admitted through control valve 48 into the feed chambers 50 of heat exchanger 52. After being preheated therein, feed flows into a degasser unit 54 and a filter cartridge 56 contained therein, through a connecting pipe 58 and into the feed manifold 24. The inlet 60 from connecting pipe 58 into the feed manifold 24 is on the opposite side of an outlet 62 in an equalizer pipe 64 which connects feed manifold 24 with the level control manifold 28. Equalizer pipe 64 thereby ensures that the level of feed 26 in the boiling chambers within the evaporator/condenser core 22 is maintained at the same level as in the level control manifold 28.

A stand pipe 66 in the product manifold 40 routes steam and the non-condensible gases through degasser 54 which rise through filter cartridge 56 and pass through line 68 where they mix with waste feed exiting level control manifold 28 into drain line 70 through restrictor 72 and into the waste line chambers 74 of heat exchanger 52. Pump 76 moves the waste through solenoid valve 78 and out through waste line 80. The condensed product is collected in product manifold 40 where it drains through drain line 82 into the product chambers 84 of heat exchanger 52. A flow meter 86 measures the flow of condensed product out of heat exchanger 52 and pump 88 pumps product out of the system through a purity monitor sensor 90, solenoid valve 92, and check valve 94 into product line 96.

Heat exchanger 52 is therefore a three-fluid heat exchanger wherein incoming feed is preheated by both the condensed product and the waste. Therefore, as in the inventor's prior design, the feed fluid is preheated with excess heat in a heat exchanger which reduces the temperature of product to levels which approach ambient. Therefore, with this arrangement, the system is very energy efficient and only small amounts of heat need be added by strip heaters 98 positioned along the lower surfaces of the feed manifold 24 to start the system. During operation, little, if any, heat is required.

A vacuum relief valve 100 and a pressure relief valve 102 are mounted to condenser manifold 38 to control the pressure in the system and prevent excess pressure or vacuum build-up. A thermal switch 104 senses the release of steam through the pressure relief valve 102 which indicates a ready to run condition in the system to turn on the product pump 88. A second thermal switch 106 shuts down strip heaters 98. The by-pass line 110 is wrapped around an incoming feed line to preheat the feed liquid with the steam discharge from pressure relief valve 102.

The level control manifold 28 has an associated high and low pressure switch 112, and a high level switch 114 and low level switch 116 for controlling and monitoring the pressure and fluid level in level control manifold 28. A balance line 118 interconnects the evaporator manifold 30 with the level control manifold 28 and balances the pressure therebetween.

In simple terms, the overall operation of the system may be described as follows. Feed fluid enters to the system, under control of the float valve in the level control manifold and passes through the heat exchanger where it is preheated, through a filter and degasser, and into the feed manifold. In the feed manifold, the feed fluid is maintained at a height which substantially covers the boiling surfaces of the plates comprising the boiling chambers so that steam rises therefrom into the evaporator manifold where a compressor pressurizes it and routes it back through the condenser manifold into the condensing chambers of the evaporator/condenser core. The steam condenses in the condensing chambers, thereby giving up its heat to boil more feed, and passes therethrough into the product manifold. The product is then drained and passes through the heat exchanger where its excess heat is transferred to the incoming feed and acts as a preheater therefor. The condensed product is then pumped out of the system. A continuous flow of feed through the system inhibits corrosion and other contamination thereof. Alternately, for product concentration applications, the waste (concentrated feed liquid) is the desired end product and the condensed product is merely a by product. The concentrated feed leaves the feed manifold and is routed back through the level control manifold and then into the heat exchanger where its excess heat is also used to preheat incoming feed, after which it is pumped out of the system as waste. Non-condensible gases are also collected, added to the concentrated waste and included therewith as the waste is pumped out of the system. Additionally, as shown in FIG.

22, individual vapor compression distillation devices may be connected in parallel to provide increased output. Having briefly described the major functional components of the invention, and its method of operation, a more detailed explanation of these various components now follows.

Figure 2:
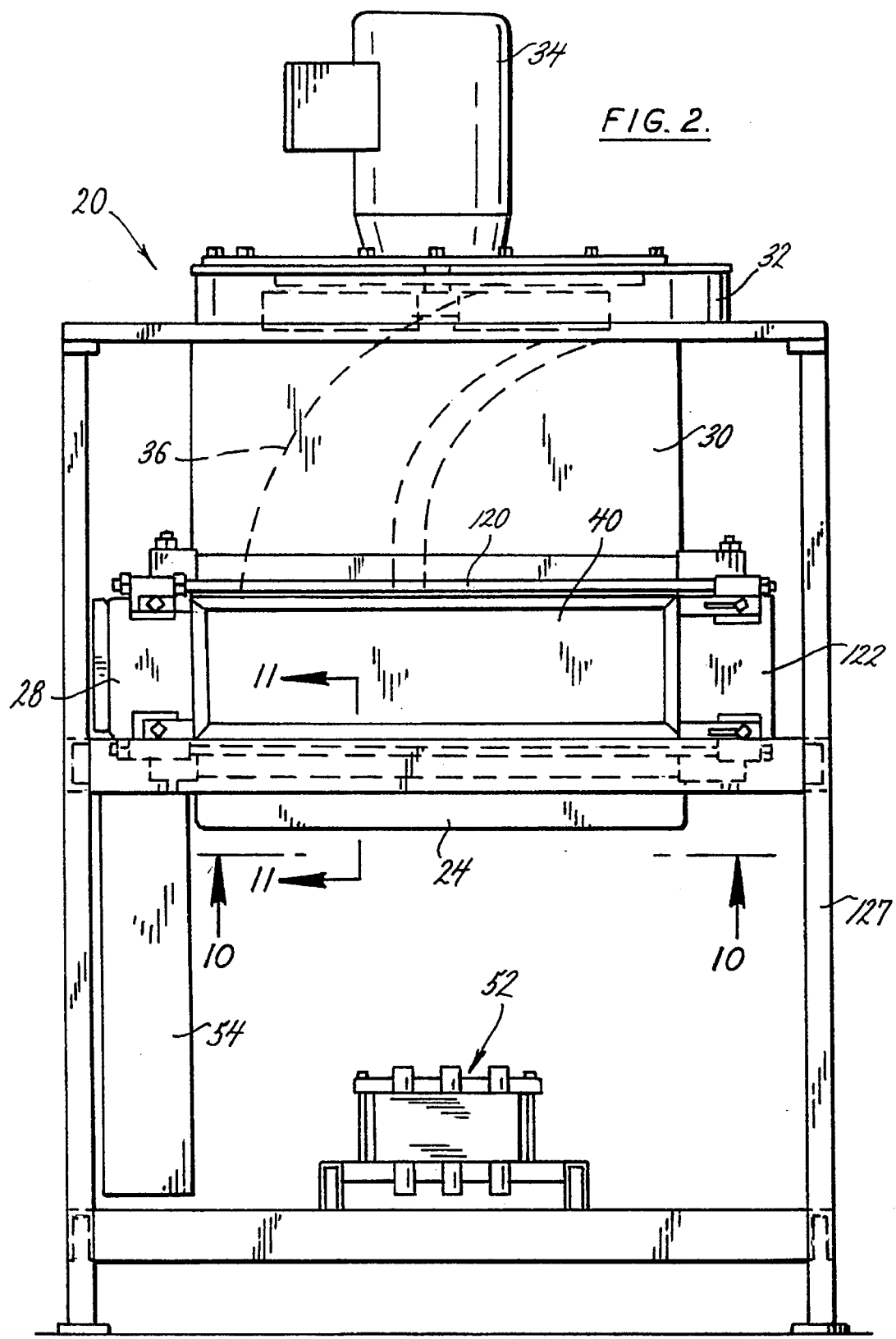
FIG. 2 is a side elevational view of the present invention.
Figure 3:
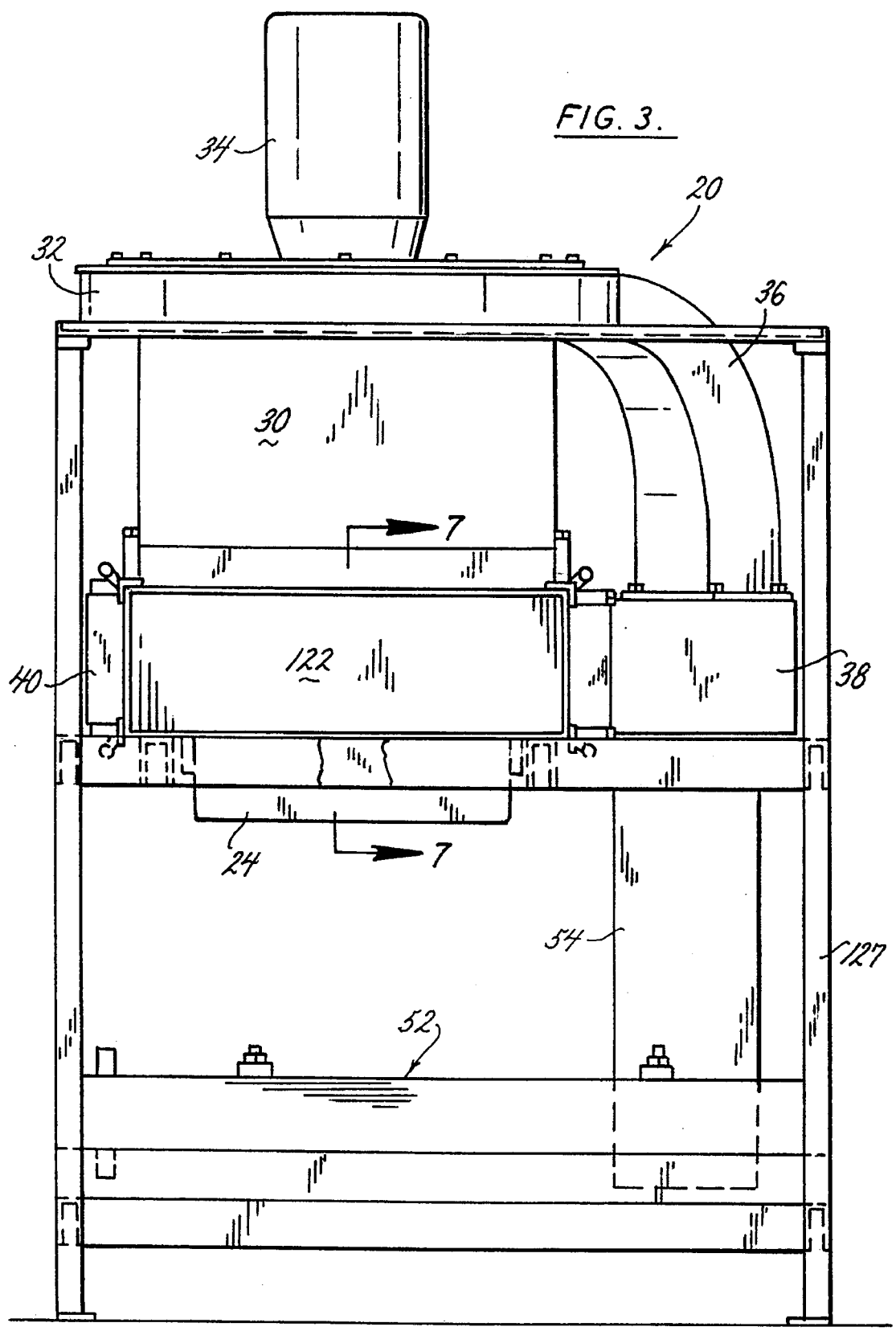
FIG. 3 is a back elevational view of the present invention.
Figure 4:
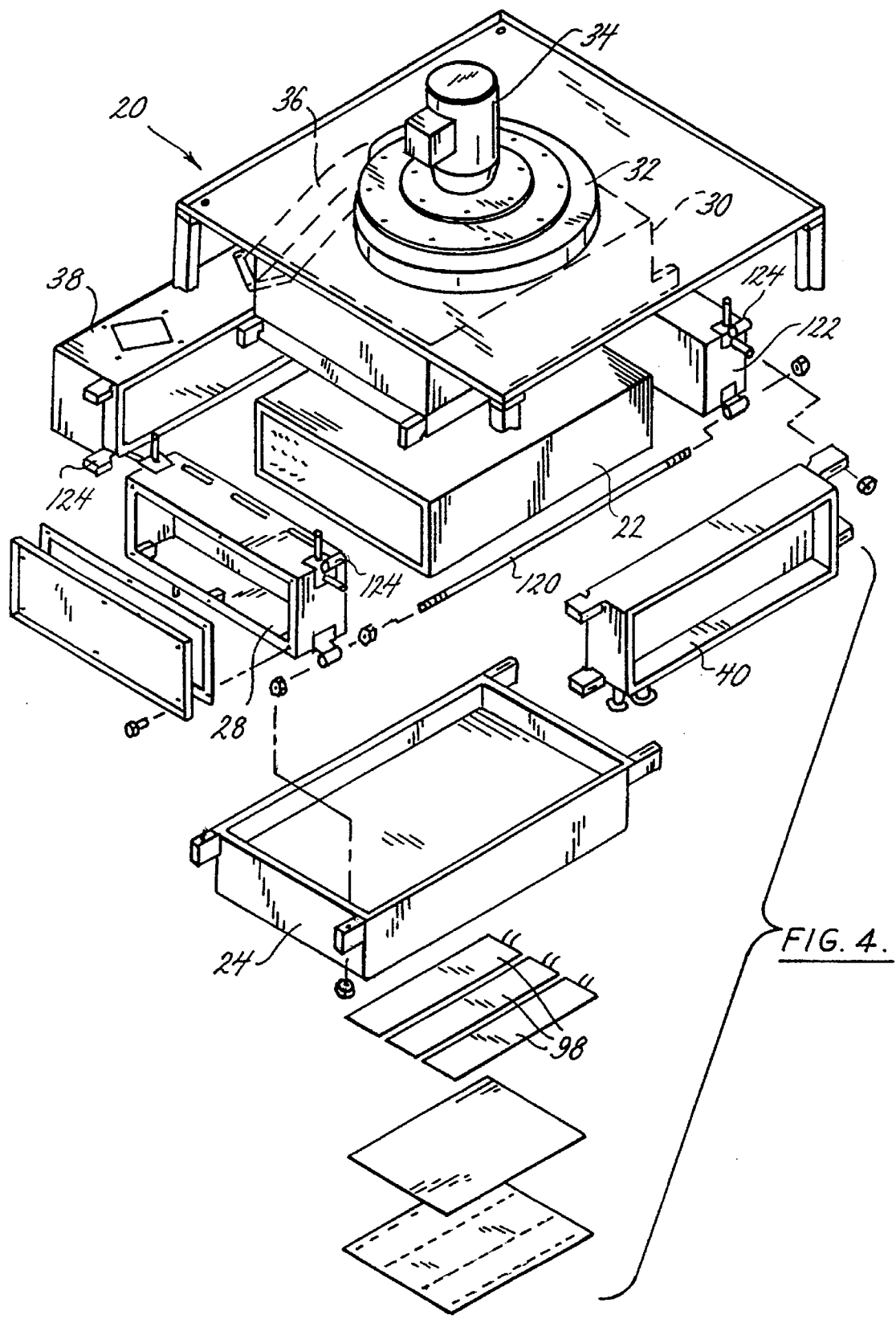
FIG. 4 is an exploded perspective view of the evaporator/condenser core with manifolds.

As shown in FIGS. 1–3, and in the partial exploded perspective of FIG. 4, the inventor's vapor compression distillation device 20 is mechanically assembled into an efficiently packaged assembly, and supported by a framework for floor mounting. The major components, as previously identified with respect to the explanation of FIG. 6, are shown in these figures and provide an overview of the mechanical arrangement thereof. Generally, the evaporator/condenser core 22 is centrally located with the product manifold 40 at its right side, the condenser manifold 38 at its left side, the level control manifold 28 in front, the feed manifold 24 below, and the evaporator manifold 30 above. The compressor 32 and compressor motor 34 are mounted above the evaporator manifold 30, with steam duct 36 feeding therefrom into the top of the condenser manifold 38. As is shown in the drawings, the steam duct 36 has an expanding cross-sectional area to provide minimal resistance to the pressurized steam as it leaves the compressor 32 and expands into the condenser manifold 38. A plurality of draw rods 120 with their associated hardware extend between the level control manifold 28 at the front and a compression block 122 at the rear for compressing the evaporator/condenser core 22 in order to maintain the seals between adjacent plates thereof as well as between the level control manifold 28 and the evaporator/condenser core 22. Additionally, other bosses 124 are mounted to the level control manifold 28, compression block 122, and the product manifold 40 and condenser manifold 38 which, along with the appropriate studs and mounting hardware secure the entire assembly together, as would be well known to those of ordinary skill in the art. The heat exchanger 52 is mounted to the base of the frame 127 and, in these several figures of drawings, plumbing connections extending between all of the various components are not shown for purposes of clarity. These plumbing and fluid connections are shown in other figures of the drawings and will be explained in connection therewith.

Figure 5:
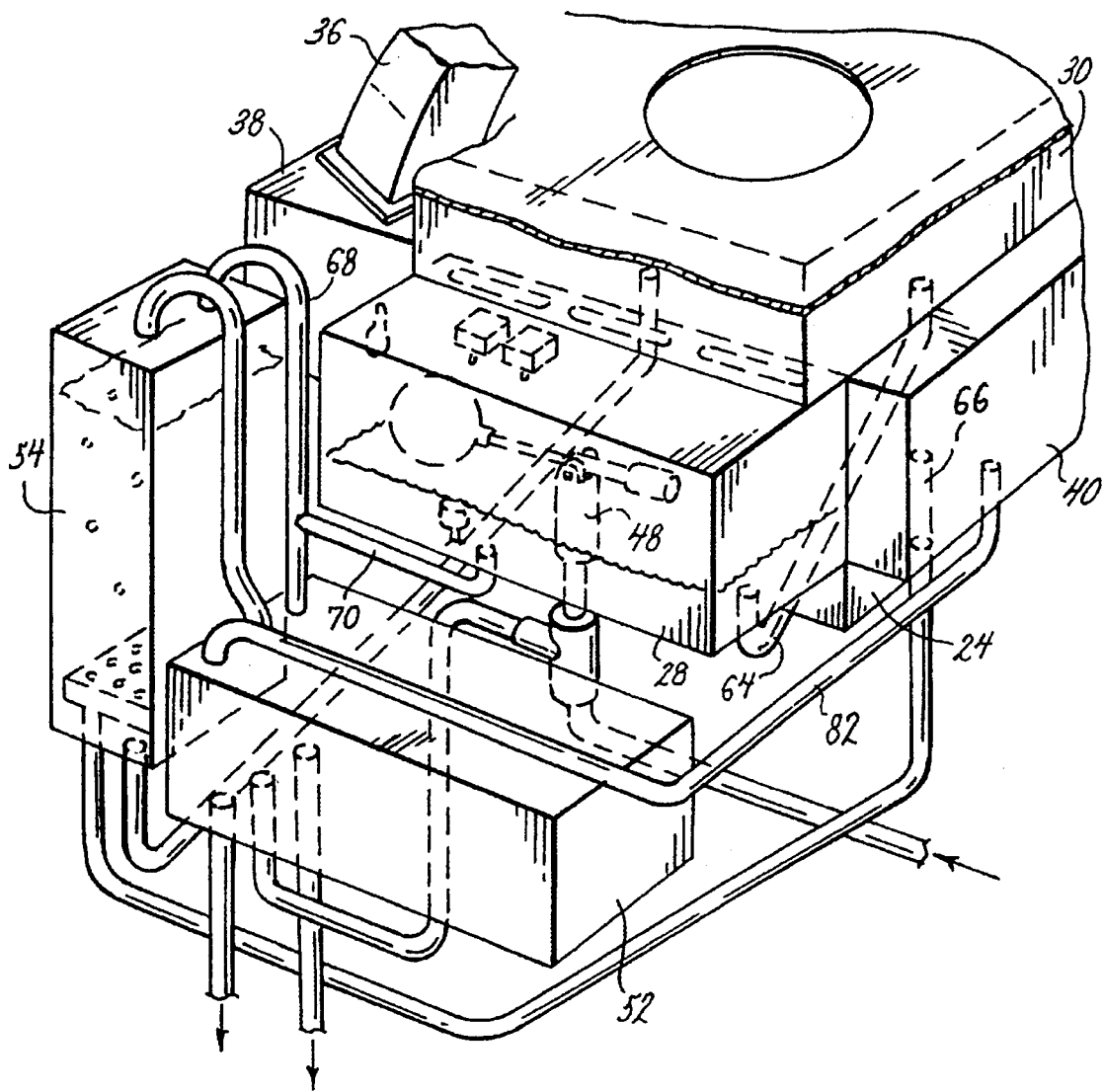
FIG. 5 is a perspective view detailing the piping arrangement for fluid flow through the evaporator/condenser section and manifolds therefor.

For example, as shown in FIG. 5, the piping between the level control manifold 28, the feed manifold 24, heat exchanger 52, and degasser 54 are shown. As depicted therein, the various fluids and gases are plumbed from one major functional component to the other.

As shown in FIGS. 7–9, the clamping and sealing arrangements between the evaporator/condenser core 22 and the feed manifold 24, evaporator manifold 30, and compression block 122 are shown. More specifically, as shown in FIG. 7, a seal 126 is shown between the evaporator manifold 30 and the compression block 122. As shown in FIG. 8, the same seal 126 seals the evaporator manifold 30 to the evaporator/condenser core 22 along its length. Seal 130 seals the condenser manifold 38 to the evaporator/condenser core 22 along its length. As shown in FIG. 9, a cross-section is taken through one of the bosses 124 to provide further detail of the mechanical arrangement between bosses 124 and the draw rods 120.

Figure 10:
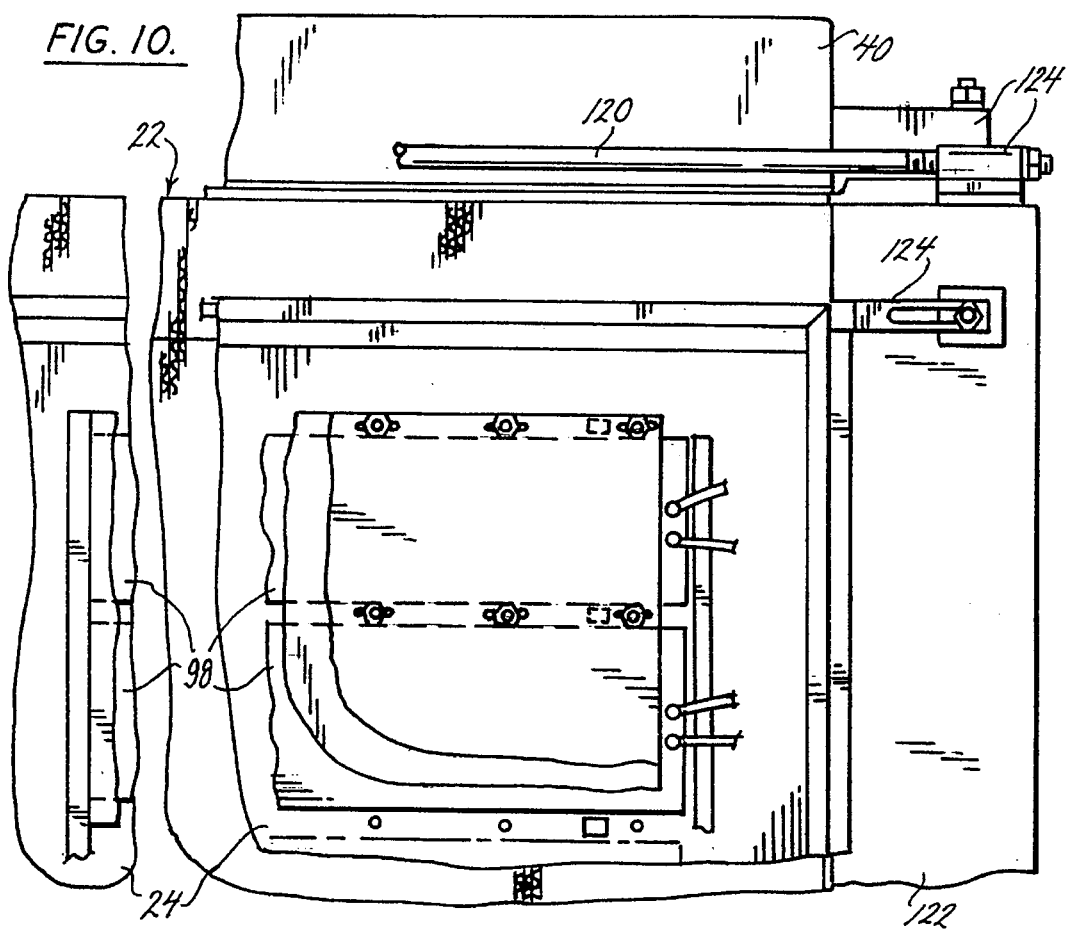
FIG. 10 is taken along the plane of line 10—10 in FIG. 2 and is a partial bottom view of the evaporator/condenser core detailing mounting of the strip heaters to the feed manifold.

As shown in FIG. 10, one or more strip heaters 98 are mounted to the bottom of the feed manifold 24 and are used to add heat, as required, to boil the feed with- in the boiling chambers of the evaporator/condenser core 22.

Figure 11:
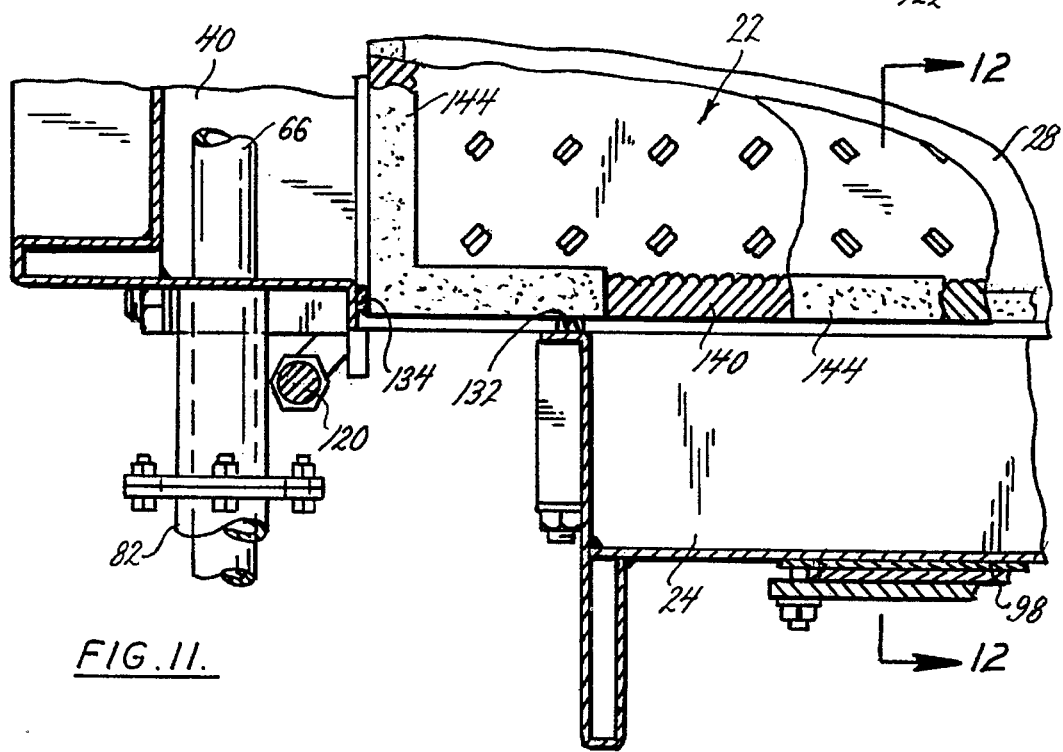
FIG. 11 is taken along the plane of line 11—11 in FIG. 2 and is a cross-sectional view detailing the feed and product manifold seals to the evaporator/condenser core.

As shown in FIGS. 7 and 11, the feed manifold 24 extends less than the full width of the evaporator/condenser core 22 and a seal 132 seals the feed manifold 24 thereto along its periphery. The product manifold 40 is sealed along the length of the evaporator/condenser core 22 by still another seal 134. As shown in FIG. 12, the back of the feed manifold 24 is also sealed by seal 132 to the compression block 122, seal 126 extending completely around to also seal the evaporator manifold 30 to compression block 122. As would be apparent to one of ordinary skill in the art, as is explained generally herein, the draw rods 120 and their associated hardware, along with bosses 124 and their associated hardware are used to join the various manifolds and compression block to the evaporator/condenser core, and also provide the pressure for compressing the seals which achieve the fluid tight seal therebetween. While this particular mechanical structure has been disclosed as the inventor's preferred embodiment, there are a myriad of arrangements which would be well known to those of ordinary skill in the art and which would also be successful in achieving the mounting and sealing of these various manifolds to the evaporator condenser plate pack.

Figure 13:
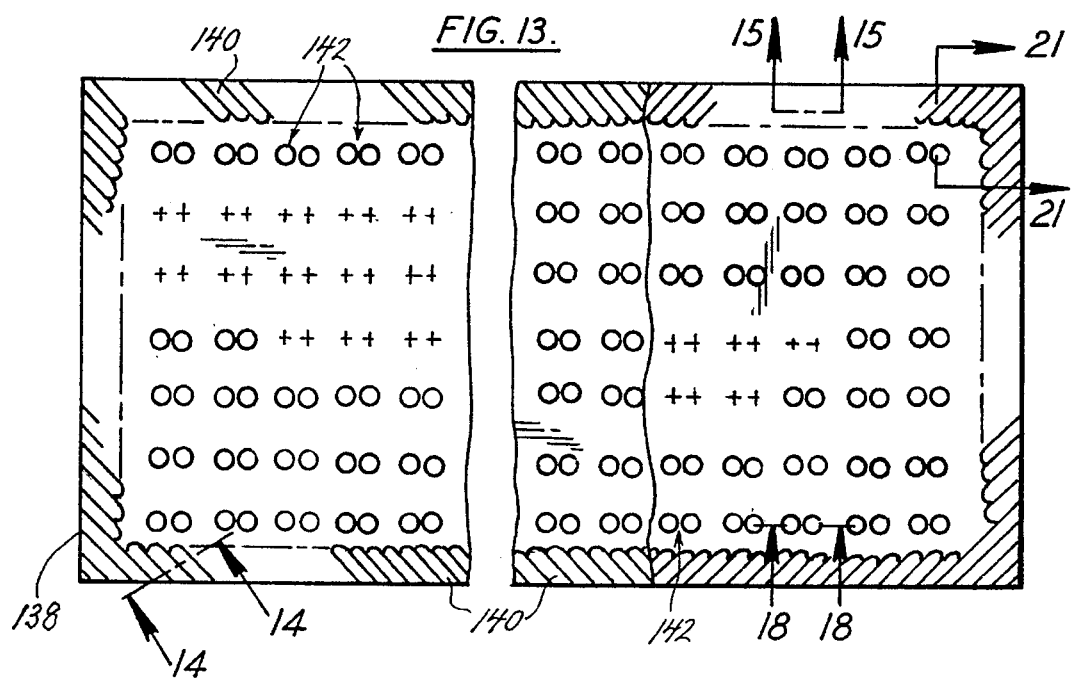
FIG. 13 is a plan view of the evaporator/condenser plates comprising the core.
Figure 14:
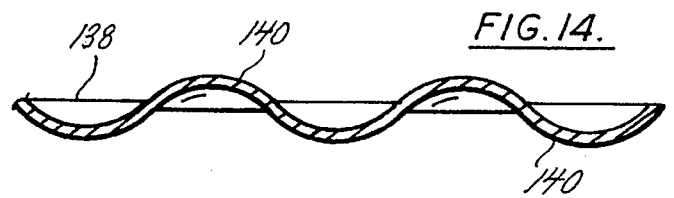
FIG. 14 is a partial cross-sectional view taken along the plane of line 14—14 in FIG. 13 and detailing the continuous corrugations formed around the periphery of the evaporator/condenser plates.
Figure 15:
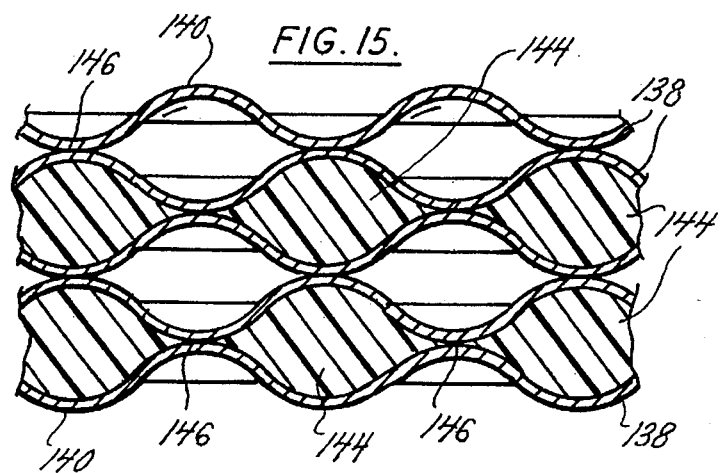
FIG. 15 is a partial cross-sectional view taken along the plane of line 15—15 in FIG. 13 and detailing the waffle-like seals formed between the continuous corrugations in the periphery of adjacent evaporator/condenser plates.
Figure 16:
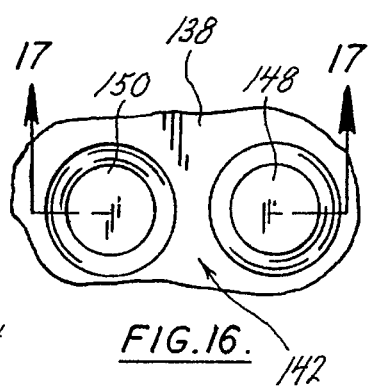
FIG. 16 is a plan view of an interrupted corrugation, a plurality of which is arranged across the face of the evaporator/condenser plates.
Figure 17:
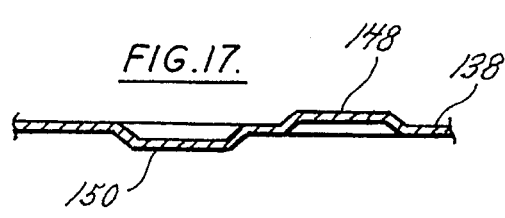
FIG. 17 is a cross-sectional view taken along the plane of line 17—17 in FIG. 16 showing the profiling of the interrupted corrugation pattern.
Figure 18:
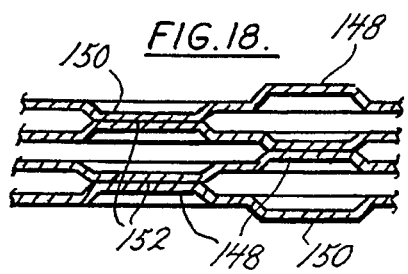
FIG. 18 is a partial cross-sectional view taken along the plane of line 18—18 in FIG. 13 and detailing the contact points between adjacent plates within the boiling and condenser chambers.

As shown in FIGS. 13–21, the plate construction for each of the plates 138 which comprise the evaporator/condenser core 22 is shown. As shown therein, a periphery of corrugations 140 surrounds the exterior of each plate 138 and a cross hatch of interrupted corrugations 142 are spaced evenly throughout the central portion of the plate. As shown in FIG. 13, a single plate design is utilized and then every other plate is reversed in assembling the evaporator/condenser core. As shown in FIG. 14, the peripheral corrugations 140 may be generally sinusoidal with a raised portion extending both to the front and the rear of the plate in order to support adjacent plates both to the front and the rear. This is shown in FIG. 15 which also details the formation of seals 144 contained within and surrounding contact points 146 between adjacent plates. Thus, seals 144 form a waffle-like pattern which interlock these contact points 146 to thereby provide increased strength to resist the internal pressure which builds within the interior of the plates. The interrupted corrugations 142 include, as shown in FIGS. 16–18, a raised circular dimple 148 and a depressed circular dimple 150. While this particular dimple pattern is shown as the preferred embodiment, it should be well understood to those of ordinary skill in the art that other corrugation patterns would be equally as desirable and operate perhaps as well. For example, a sinusoidal interrupted corrugation is disclosed, infra. As shown in FIG. 18, the interrupted corrugations 142 match and align to provide contact points 152 between adjacent plates to mechanically support the adjacent plates across the surface thereof. The dimple pattern provides some degree of mechanical tolerance due to the diameter of the dimples 148, 150 such that precise alignment between adjacent plates is not required in order for at least some portion thereof to line up and make contact in order to provide this physical, mechanical support.

As shown in FIGS. 19–21, the seals which define the alternating boiling chambers and condensing chambers are conveniently formed within the peripheral corrugation 140. As shown in FIG. 19, a seal 154 is formed at both sides of the plate 138 as would be appropriate for a boiling chamber. It is noted that the lower portion of the seal extends horizontally a short distance in order to accommodate the feed manifold which is sized at less than the full width of the evaporator/condenser core 22. Thus, feed flows upwardly into the boiling chamber defined by this seal arrangement as shown in FIG. 19, and is prevented from flowing outwardly along either side thereof to inappropriately mix with the steam in the condenser manifold or the product in the product manifold. Instead, steam created within the boiling chamber must rise upwardly between seals 154. As shown in Figure 20, seals 156 are formed along the upper and lower edges of plate 138 and form the condensing chamber which alternates with the boiling chamber seal pattern shown in FIG. 19. In the condensing chamber, steam enters from the left side adjacent the condenser manifold 38 and flows therethrough where it is condensed by the time it exits the condensing chamber into the product manifold 40. Thus, true perpendicular flow is experienced in the evaporator condenser plate pack of the present invention. The boiling action is strictly vertical from bottom to top, and the condensing action is strictly horizontal from left to right as defined by the seal patterns. FIG. 21 provides still another view of the seals 144 which are formed in the peripheral corrugation 140.

Figure 23:
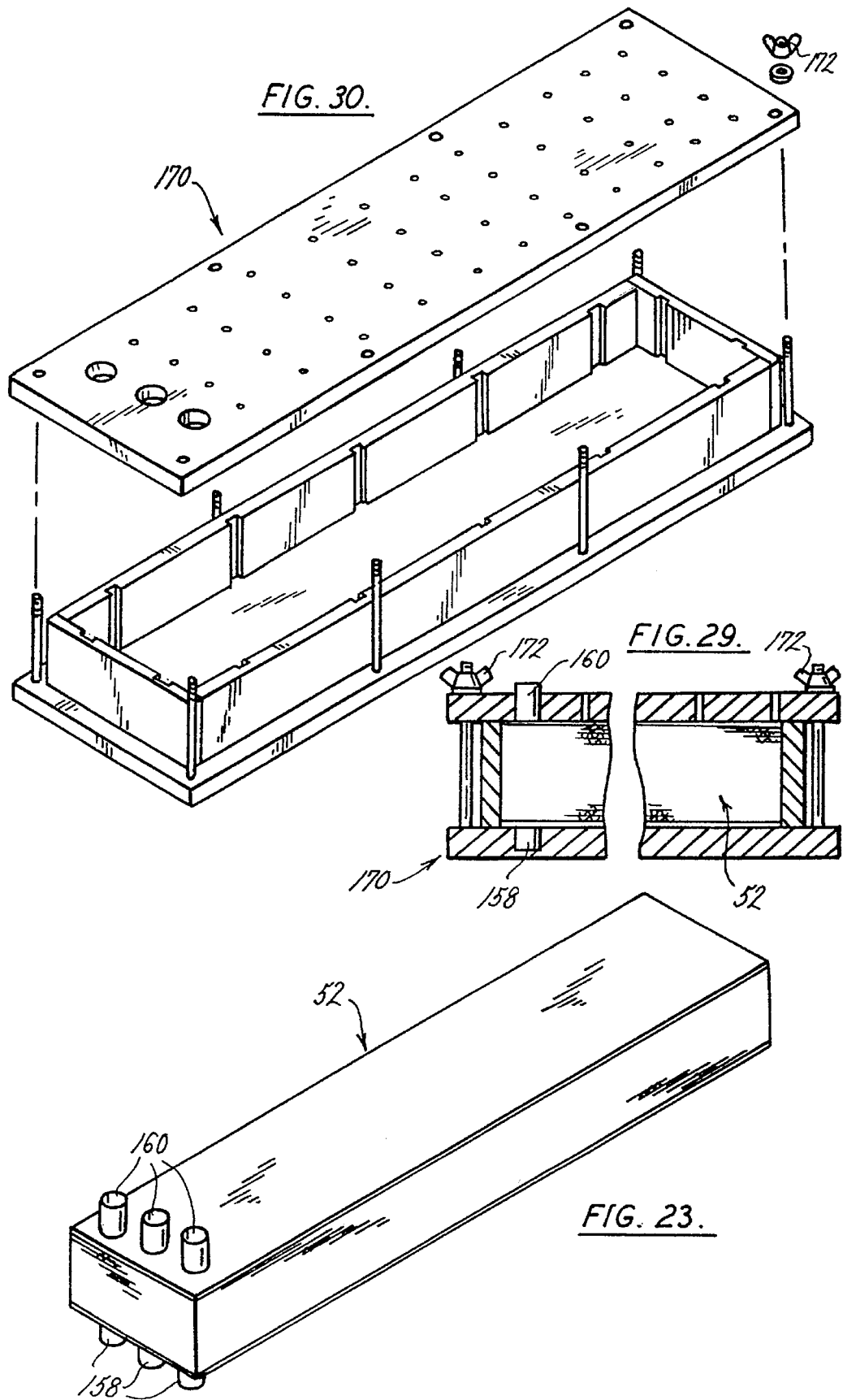
FIG. 23 is a perspective view of a heat exchanger plate pack.
Figure 24:
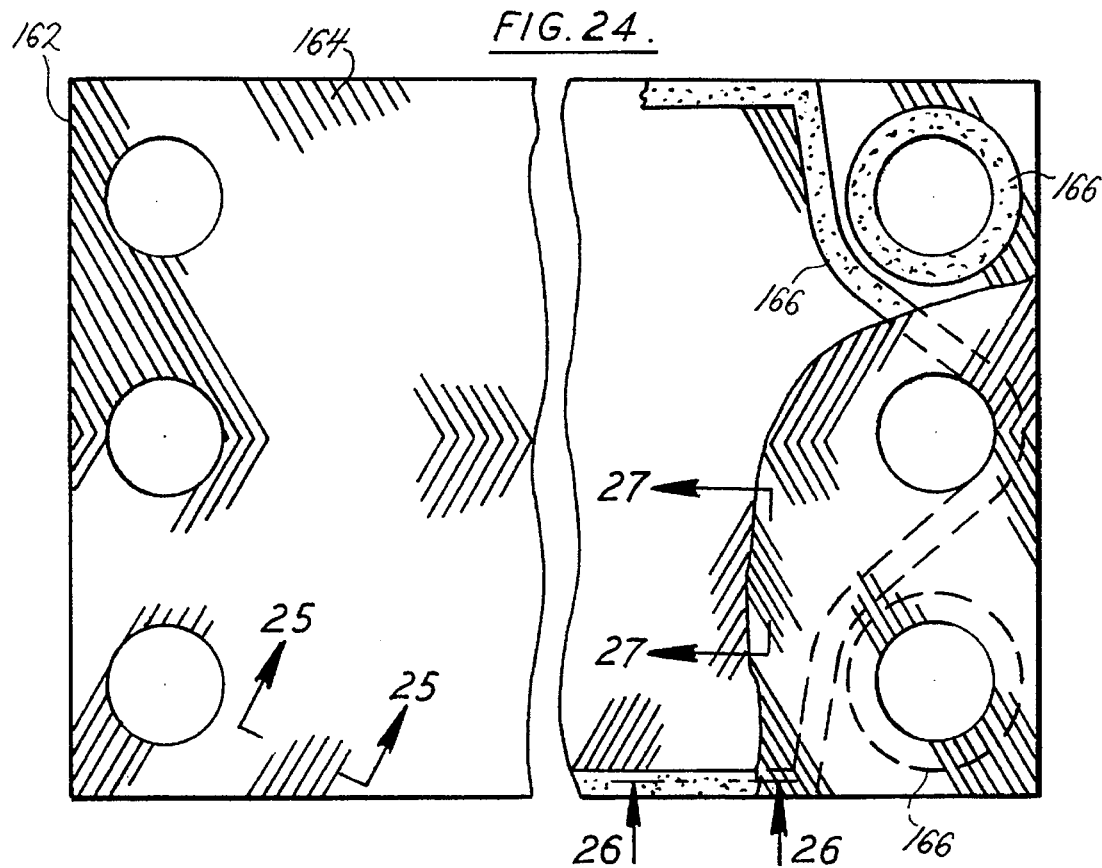
FIG. 24 is an elevational view of a heat exchanger plate.
Figure 25:
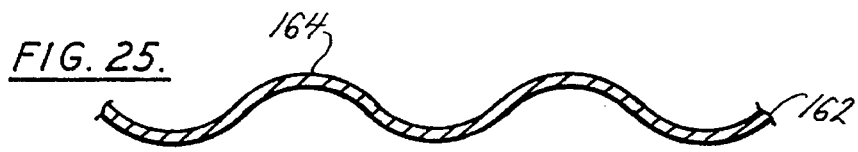
FIG. 25 is a cross-sectional view taken along the plane of line 25—25 in FIG. 24 and detailing the corrugation pattern in an individual heat exchanger plate.
Figure 26:
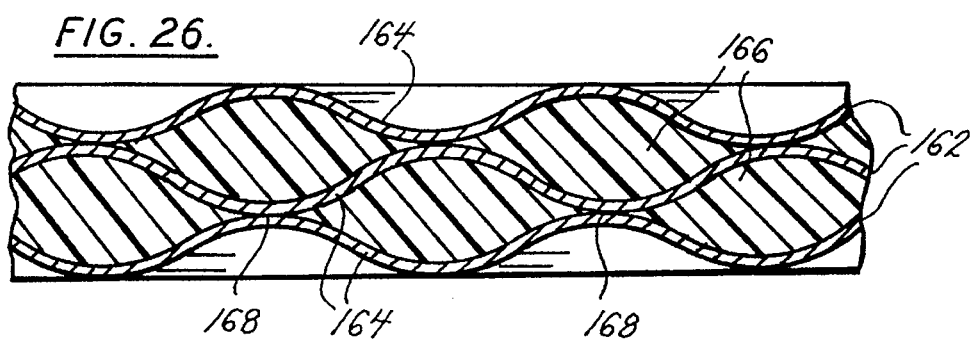
FIG. 26 is a partial cross-sectional view taken along the plane of line 26—26 in FIG. 24 and detailing the edge seals formed between adjacent plates.
Figure 27:
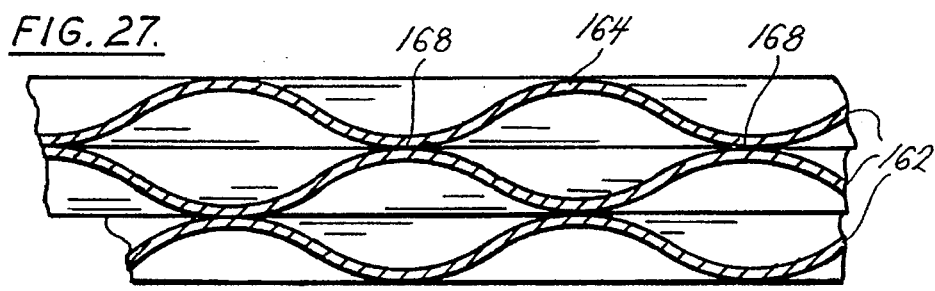
FIG. 27 is a partial cross-sectional view taken along the plane of line 27—27 in FIG. 24 and detailing the contact points between adjacent plates within the fluid chambers.
Figure 28:
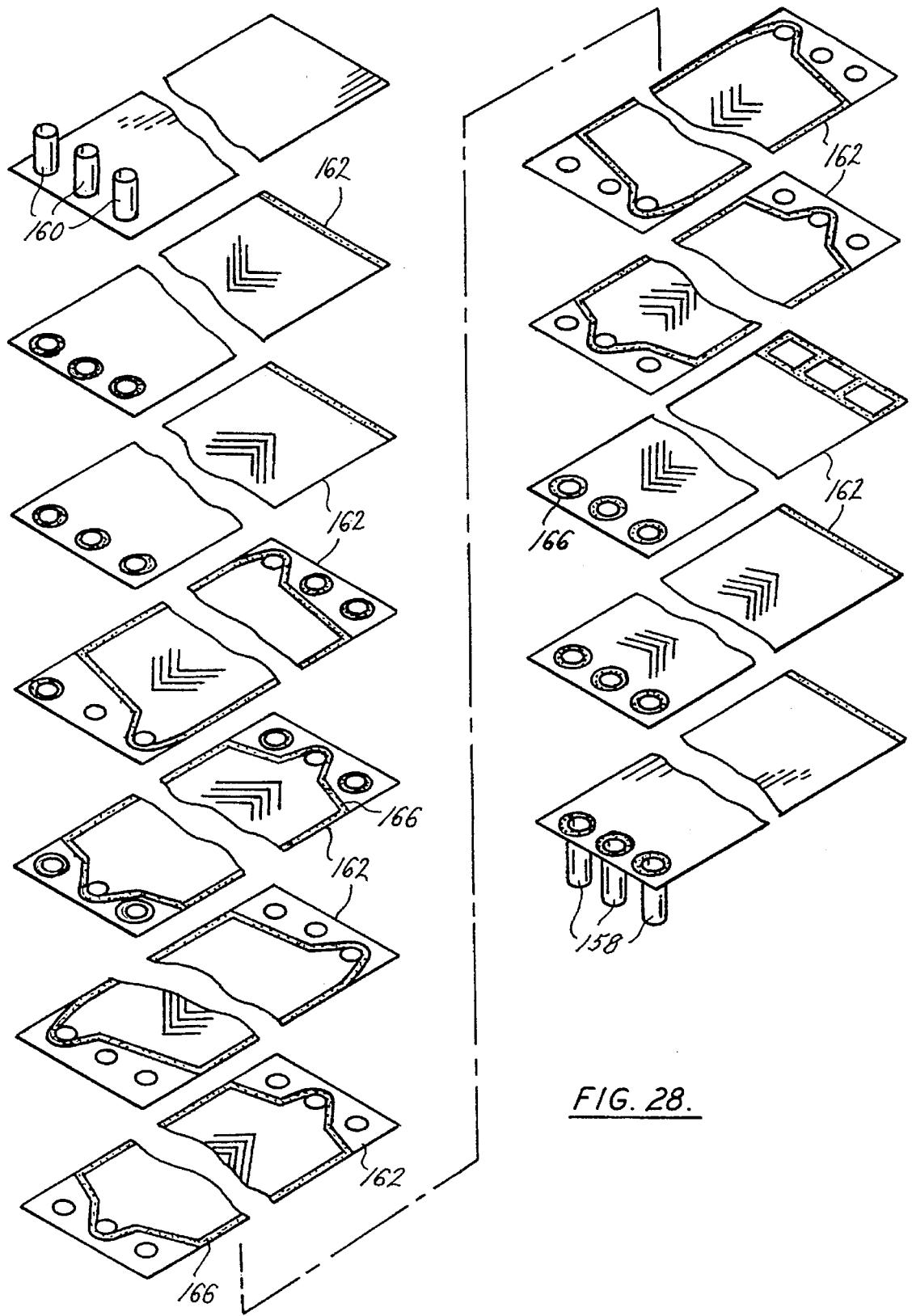
FIG. 28 is an exploded perspective view of the seal pattern for a heat exchanger plate pack.
Figure 31:
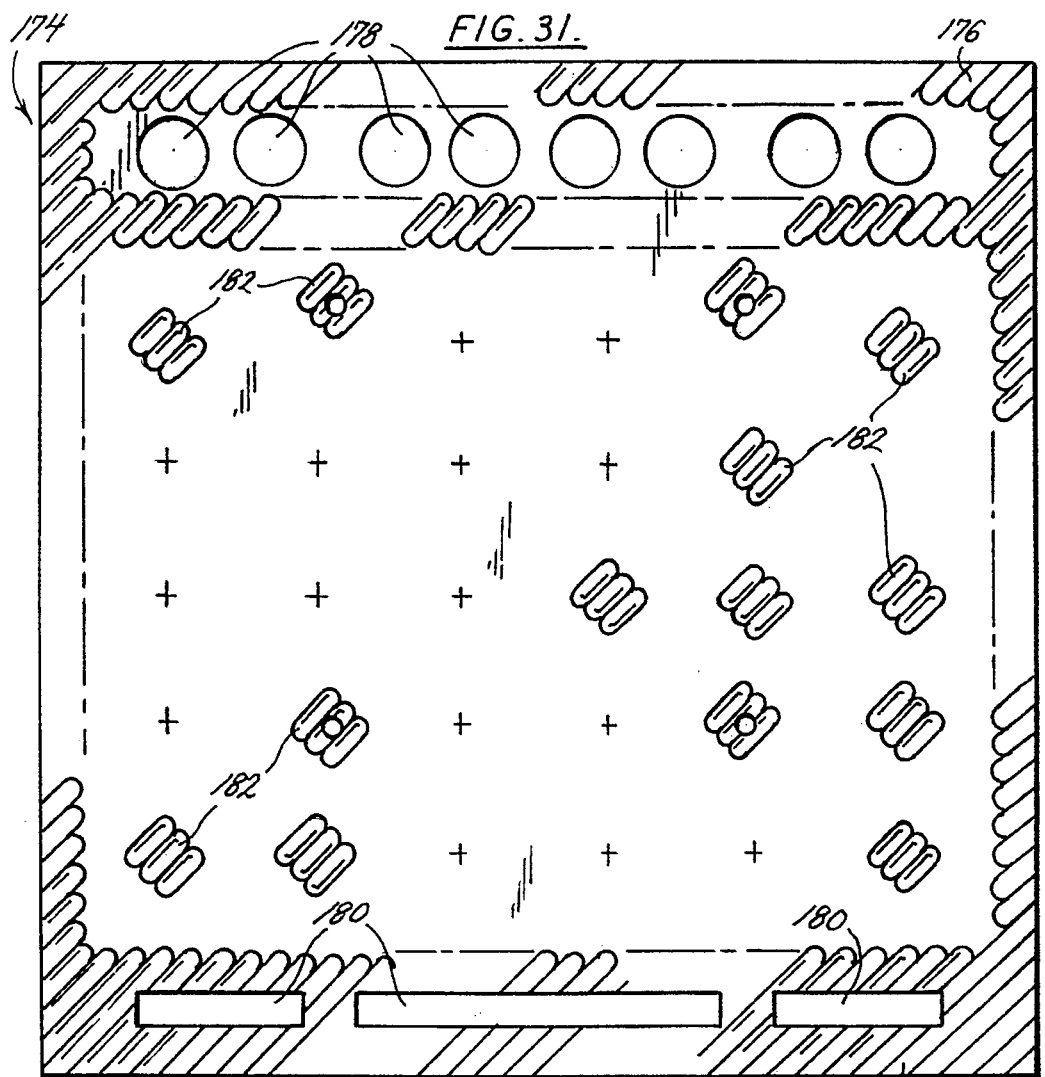
FIG. 31 is a front elevational view of an evaporator/condenser plate suitable for retrofit in a prior design.

The construction for heat exchanger 52 is shown in FIGS. 23–30. As shown in FIG. 23, a completed heat exchanger 52 has three separate chambers, with three bottom conduit openings 158 and three top conduit openings 160. Individual plate design is shown in Figures 24–27, along with sealing patterns between adjacent plates. As shown therein, each plate 162 has a herringbone corrugation pattern 164 extending across its full width. The corrugation pattern 164 is generally sinusoidal as shown in cross-sectional detail in FIG. 25. Thus, seals 166, as shown in FIG. 26 may be conveniently formed between adjacent plates by laying down a bead of liquid sealing material, such as silicone or the like, and the seals cured to thereby join the plates together. As shown in FIG. 27, contact points 168 mechanically support adjacent plates from each other to thereby add structural rigidity across the face of all of the plates. The exploded perspective of FIG. 28 further details the seal pattern between adjacent plates and the hole pattern which accommodates the three fluid passages therethrough.

A fixture 170 as shown in FIGS. 29 and 30 is used to construct the heat exchanger 52. As shown therein, individual plates are laid within the fixture 170, with seals being formed between placement of individual plates, after which the plates are pressurized with the wing nut fasteners 172 and the seals are cured, such as by heating or the like. The heat exchanger 52 may then be removed from the fixture 170 and becomes a self-contained sealed unit as shown in FIG. 23.

Figure 32:
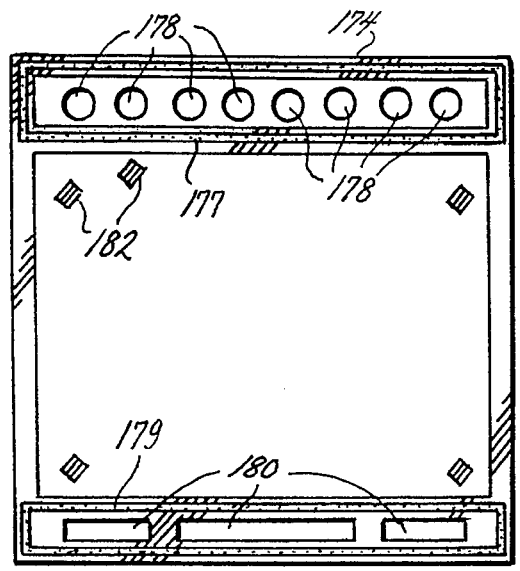
FIG. 32 is an elevational view of an evaporator/condenser plate showing the seal pattern for a boiling chamber.
Figure 33:
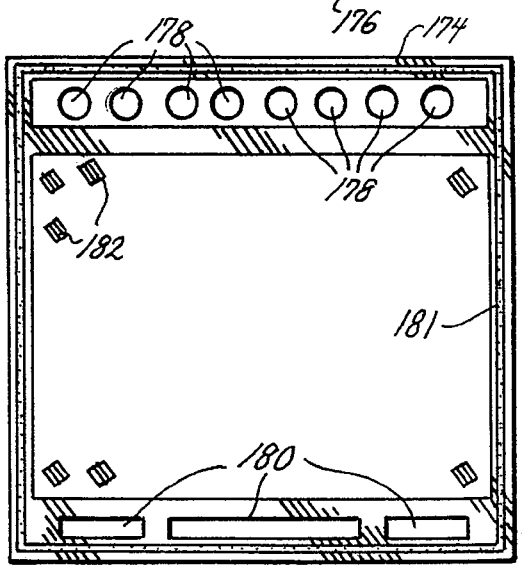
FIG. 33 is a front elevational view of an evaporator/condenser plate showing the seal pattern for a condensing chamber.

As shown in FIGS. 31–35, an alternate plate design 174 may be used to form a plate pack suitable for retrofit into the design shown in the inventor's prior U.S. Pat. No. 4,671,856 and as the evaporator/condenser core therefor. This retrofit plate 174 includes the teachings of the present invention in that a peripheral corrugation 176 is formed about the periphery of the retrofit plate 174, and also surrounds steam manifold openings 178 which form the steam manifold, and product manifold slots 180 for product manifolds. Additionally, interrupted corrugations 182 extend across the face of the internal portion of the retrofit plate 174, these interrupted corrugations 182 being of similar sinusoidal shape as those contained in the peripheral corrugation 176. As shown in FIGS. 32 and 33, seals may also be conveniently formed between adjacent plates to define the boiling chambers and the condensing chambers. As shown in FIG. 32, seals 177, 179 surround the steam manifold openings 178 and the product manifold slots 180 respectively. This isolates them from the face of the plate such that FIG. 32 shows the seal pattern for a boiling chamber. As shown in FIG. 33, a seal 181 surrounds the entire plate. This leaves the steam manifold openings 178 in communication with the product manifold slots 180 such that FIG. 33 defines the sealing pattern for a condensing chamber. The assembly therefor is shown in somewhat greater detail in FIGS. 34 and 35. The retrofit evaporator/condenser core formed with the retrofit plates 174 and sealing patterns shown may be conveniently used to retrofit the inventor's prior design as shown in his prior patent which thereby incorporates the unique corrugation patterns, sealing patterns and methods, and structural support provided by the interrupted corrugations as disclosed and claimed herein.

There are various changes and modifications which may be made to the invention as would be apparent to those skilled in the art. However, these changes or modifications are included in the teaching of the disclosure, and it is intended that the invention be limited only by the scope of the claims appended hereto.

What is claimed is:

1. A vapor compression distillation-product concentration device comprising:

a plate-heat exchanger having a plurality of spaced apart plates arranged in a face-to-face configuration with the spaces therebetween forming a plurality of boiling chambers for evaporating a feed liquid into a vapor and a plurality of alternating condensing chambers for condensing said vapor into a distillate, said boiling chambers extending from a first edge of the heat exchanger to a second edge of the heat exchanger, said condensing chambers extending from a third edge of the heat exchanger to a fourth edge of the heat exchanger;

a compressor for pressurizing said vapor as it passes between said boiling chambers and said condensing chambers;

a first edge manifold adjacent the first edge of said heat exchanger and in fluid communication with the boiling chambers for supplying the feed liquid to the plurality of boiling chambers along the first edge of said heat exchanger;

a second edge manifold adjacent the second edge of said heat exchanger and in fluid communication with the boiling chambers for collecting the vapor escaping from the boiling chambers along the second edge of said heat exchanger; and a third edge manifold adjacent to the third edge of said heat exchanger and in fluid communication with the condensing chambers for feeding said compressed vapor to the plurality of condensing chambers along the third edge of said heat exchanger;

a fourth edge manifold adjacent the fourth edge of said heat exchanger and in fluid communication with the condensing chambers for collecting the distillate exiting said condensing chambers along the fourth edge of said heat exchanger;

each of said edges being offset from each of the other of said edges.

2. The device of claim 1 wherein each of said plates comprising said heat exchanger is formed substantially in the shape of a polygon, and wherein said first and second edges are oriented along substantially opposite edges of said polygonal plates and said third and fourth edges are oriented along different substantially opposite edges of said polygonal plates.

3. The device of claim 2 wherein said heat exchanger plates are formed substantially in the shape of a rectangle.

4. The device of claim 3 wherein said first and second edges are the bottom and top edges, respectively, of said heat exchanger.

5. The device of claim 1 further comprising a plurality of gaskets for defining said boiling chambers and said condensing chambers, said plurality of gaskets being positioned substantially along the outer edges of said heat exchanger.

6. The device of claim 5 wherein said plurality of gaskets are positioned solely along the outer edges thereof.

7. The device of claim 1 wherein said condensing chambers and said boiling chambers extend substantially along the entirety of said plates.

8. The device of claim 1 wherein said first edge manifold and said first edge of said heat exchanger are configured so that feed liquid flowing from the first edge manifold into said boiling chambers flows freely into said boiling chambers by passing between edges of the plates forming said boiling chambers.

9. The device of claim 8 wherein said second edge manifold and said second edge of said heat exchanger are configured so that vapor escapes from said boiling chambers by flowing out from between the outer edges of the plates forming said boiling chambers.

10. The device of claim 9 wherein said third edge manifold and said third edge of said heat exchanger are configured so that said compressed vapor flowing from the third edge manifold into said condensing chambers flows freely into said condensing chambers by passing between the outer edges of the plates forming said condensing chambers.

11. The device of claim 10 wherein said fourth edge manifold and said fourth edge of said heat exchanger are configured so that said distillate exists freely from said condensing chambers by flowing out from between the outer edges of the plates forming said condensing chambers.

12. The device of claim 1 wherein said plates further/ comprise means for preventing passage of fluid from any one chamber directly into any other chamber.

13. A vapor compression distillation-product concentration device, said device including a plate-heat exchanger having a plurality of spaced apart plates arranged in a face-to-face configuration with the spaces therebetween forming a plurality of boiling chambers for evaporating a feed liquid into a vapor and a plurality of alternating condensing chambers for condensing said vapor into a distillate, a compressor for pressurizing said vapor as it passes between said boiling chambers and said condensing chambers, said boiling chambers and said condensing chambers extending along substantially the entirety of said plates, means for providing a substantially vertical flow path for said feed liquid as it traverses said boiling chambers and evaporates into a vapor said device being configured so that the evaporating feed liquid flows substantially upward through said boiling chambers, means for providing a substantially horizontal flow path for said vapor as it traverses said condensing chambers and condenses into said distillate, said device further comprising a plurality of gaskets formed along the edges of said plates for defining said boiling chambers and said condensing chambers.

14. The device of claim 13 wherein said plates have no passageways extending perpendicularly therethrough which interconnect any of said chambers.

15. A vapor compression distillation-product concentration device, said device including a plate-heat exchanger having a plurality of spaced apart plates arranged in a face-to-face configuration with the spaces therebetween forming a plurality of boiling chambers for evaporating a feed liquid into a vapor and a plurality of alternating condensing chambers for condensing said vapor into e distillate, each of said boiling and condensing chambers extending substantially throughout the entirety of the space between the plates, a compressor for pressurizing said vapor as it passes between said boiling chambers and said condensing chambers, a pair of manifolds secured to opposing edges of said heat exchanger and in communication with the boiling chambers for supplying said feed liquid thereinto and for collecting said vapor emanating therefrom, and a second pair of manifolds secured to different opposing edges of said heat exchanger and in communication with the condensing chambers for supplying said vapor thereinto and for collecting said distillate emanating therefrom, each of said plates being substantially identical in shape and having a plurality of corrugation points formed in its periphery and spaced across the surface thereof, at least some of the corrugation points of each of said plates engaging corrugation points of an adjacent one of said plates for maintaining the plates in a spaced apart configuration, and further comprising a gasket for Sealing each of the boiling chambers and condensing chambers, said gaskets having portions extending through and around said Corrugation contact points between said adjacent peripheries to thereby interlock each of said gaskets to said plates.

16. The device of claim 15 wherein said plates further comprise means for preventing passage of fluid from any one chamber directly into any other chamber.

17. A method for producing a distillate from a feed material which is at least in part liquid utilizing a vapor compression distillation device having a plate-heat exchanger with alternating boiling and condensing chambers, the method comprising the steps of:

continuously feeding a circulating supply of said feed material into bottom edges of said boiling chambers, evaporating a portion of said feed material into a vapor, channeling the vapor upward through top edges of the boiling chambers, collecting said vapor exiting through the top edges of said boiling chambers, compressing said vapor after it exits through the top edges of said boiling chambers, channeling said compressed vapor into first side edges of said condensing chambers to feed the compressed vapor laterally into the condensing chambers, cooling the compressed vapor laterally fed through the condensing chambers by the feed material being channeled upwardly through the boiling chambers such that the feed material is heated by the compressed vapor, collecting the distillate produced in said condensing chambers along second edges thereof, and collecting non-evaporated feed material after it circulates through the boiling chambers, the collected feed material comprising a concentrate.

18. The method of claim 17 wherein said first and second edges are opposite each other.

19. A vapor compression distillation-product concentration device, said device including a plate-heat exchanger having a plurality of aligned, spaced apart plates with the spaces therebetween forming a plurality of boiling chambers for evaporating a feed liquid into a vapor and a plurality of alternating condensing chambers for condensing said vapor into a distillate, a compressor for pressurizing said vapor as it passes between said boiling chambers and said condensing chambers, means for supplying the feed liquid to the plurality of boiling chambers along a first edge of said heat exchanger, means for collecting the vapor escaping from the boiling chambers along a second edge of said heat exchanger, and means for feeding said compressed vapor to the plurality of condensing chambers along a third edge of said heat exchanger, each of said edges being offset from each of the other of said edges, said condensing chambers and said boiling chambers extending substantially along the entirety of said plates, said plates having no passageways extending perpendicularly therethrough which interconnect any of said chambers.

20. The device of claim 19 further comprising a plurality of gaskets extending along edges of the plates, said gaskets defining said chambers.

21. A vapor compression distillation-product concentration device comprising:

a plate-type heat exchanger having a plurality of spaced apart plates arranged in a face-to-face configuration with the spaces therebetween forming at least two boiling chambers for evaporating a feed liquid into a vapor and at least two condensing chambers for condensing said vapor into a distillate, said boiling chambers and said condensing chambers being arranged in an alternating configuration so that at least one boiling chamber is adjacent to and between two condensing chambers for transfer of heat therebetween;

a compressor for pressurizing said vapor after it exits said boiling chambers and before it enters said condensing chambers;

a first edge manifold for supplying the feed liquid to said boiling chambers along a first edge of said heat exchanger;

a second edge manifold for collecting the vapor escaping from the boiling chambers along a second edge of said heat exchanger; and a third edge manifold for feeding said compressed vapor to said condensing chambers along a third edge of said heat exchanger;

each of said edges being offset from each of the other of said edges;

the condensing chambers and said boiling chambers extending substantially along the entirety of said plates;

said plates having means being configured for preventing passage of fluid from any one chamber directly into any other chamber.

* * * * *